US006195537B1

(12) United States Patent
Allpress et al.

(10) Patent No.: US 6,195,537 B1
(45) Date of Patent: Feb. 27, 2001

(54) METHOD AND APPARATUS FOR STRONG SIGNAL SUPPRESSION IN MULTI-CARRIER SIGNALS

(75) Inventors: Stephen Alan Allpress, Hoboken; Carmine James Pagano, Blairstown; Joseph Anthony Tarallo, Mount Olive, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 08/938,404

(22) Filed: Sep. 25, 1997

(51) Int. Cl.[7] .................................................. H04B 17/02
(52) U.S. Cl. ........................... 455/139; 455/43; 370/482; 370/517; 375/349
(58) Field of Search ................................ 455/180.1, 209, 455/306, 258, 278.1, 295–305, 63, 314, 315–324, 308–313; 330/126; 375/344, 349, 373; 327/165, 100, 324, 178

(56) References Cited

U.S. PATENT DOCUMENTS

| 5,058,107 | * | 10/1991 | Stone et al. | 370/343 |
| 5,125,100 | * | 6/1992 | Katznelson | 455/6.1 |
| 5,321,847 | * | 6/1994 | Johnson, Jr. | 455/63 |
| 5,510,743 | * | 4/1996 | Shi | 327/165 |
| 5,564,095 | * | 10/1996 | Arnstein et al. | 455/296 |
| 5,678,213 | * | 10/1997 | Myer | 455/209 |
| 5,678,218 | * | 10/1997 | Daikoku | 455/278.1 |
| 5,694,395 | * | 12/1997 | Myer et al. | 370/480 |
| 5,694,396 | * | 12/1997 | Firouzbakht et al. | 370/480 |
| 5,715,281 | * | 2/1998 | Bly et al. | 375/344 |
| 5,745,846 | * | 4/1996 | Myer et al. | 455/209 |

* cited by examiner

Primary Examiner—William G. Trost
Assistant Examiner—Charles Craver
(74) Attorney, Agent, or Firm—DeMont & Breyer, LLC; Jason Paul DeMont; Wayne S. Breyer

(57) ABSTRACT

A block radio design is disclosed that prevents the primary analog-to-digital converter from saturating and thus prevents the introduction of intermodulation products into the multi-carrier signal. The block radio comprises a strong signal suppressor that selectively suppresses any carrier signal in the multi-carrier signal before the multi-carrier signal is digitized by the analog-to-digital converter, thus preventing the possibility that the analog-to-digital converter can be saturated. Furthermore, the strong signal suppressor attenuates the stronger carrier signals without affecting the weaker carrier signals. An illustrative embodiment of the present invention comprises: a signal replicator for creating two analog representations on an incoming multi-carrier signal, a scanner that identifies the potentially problematic carrier signals in the multi-carrier signal, a resynthesizer that regenerates the potentially problematic carrier signals, and a signal combiner that subtracts the regenerated carrier signals from the original multi-carrier signal, thus creating a multi-carrier signal in which the potentially problematic carrier signals are attenuated and the weaker carrier signals are left unaffected.

15 Claims, 3 Drawing Sheets

METHOD AND APPARATUS FOR STRONG SIGNAL SUPPRESSION IN MULTI-CARRIER SIGNALS

FIELD OF THE INVENTION

The present invention relates to electronic signal processing in general, and, more particularly, to a technique for selectively suppressing carrier signals in a multi-carrier signal.

BACKGROUND OF THE INVENTION

FIG. 1 depicts wideband digital radio receiver 100 in the prior art, which may also be known as a "block" or "software" radio. Wideband digital radio receivers are increasingly common and are characterized by the fact that they digitize an incoming multi-carrier signal and separate the carrier signals digitally, in contrast to more conventional receivers that separate the carrier signals using analog bandpass filters and then digitize each carrier signal individually.

Wideband digital radio receiver 100 typically comprises antenna 101, RF front end 103, analog-to-digital converter 105 and channelizer 107. Antenna 101 receives a multi-carrier RF signal and converts it into an electrical signal for RF front end 103, in well-known fashion. RF front end 103 amplifies the multi-carrier signal, typically using a low-noise amplifier, and downconverts the multi-carrier signal to either baseband or a suitable intermediate frequency, also in well-known fashion. Analog-to-digital converter 105 digitizes the multi-carrier signal, in well-known fashion, and channelizer 107 isolates and demodulates each carrier signal of interest using digital signal processing techniques, in well-known fashion.

FIG. 2 depicts a graph of the signal strength for each of twelve frequency-disparate carrier signals in an illustrative multi-carrier signal. When the signal strength of one or more of the carrier signals is great, the danger arises that the strong carrier signals could saturate analog-to-digital converter 105. Because analog-to-digital converter 105 has a non-linear frequency response, the potential exists that inter-modulation products or "intermods" could be introduced into the digitized multi-carrier signal. Intermodulation products are clearly disadvantageous because they can attenuate or distort other carrier signals in the digitized multi-carrier signal.

Therefore, the need exists for a technique that prevents strong signals in a multi-carrier signal from saturating a device with a non-linear frequency response.

SUMMARY OF THE INVENTION

Some embodiments of the present invention are capable of preventing strong signals in a multi-carrier signal from saturating a device with a non-linear frequency response. In the context of block radio design, some embodiments of the present invention identify and selectively attenuate any carrier signal in a multi-carrier signal that could saturate the analog-to-digital converter before the multi-carrier signal is digitized by the analog-to-digital converter. Furthermore, some embodiments of the present invention attenuate the stronger carrier signals in the multi-carrier signal without affecting the weaker carrier signals.

These results are obtained in an illustrative embodiment of the present invention that comprises: a signal replicator for creating two analog representations of an incoming multi-carrier signal, a scanner that identifies the potentially problematic carrier signals in the multi-carrier signal, a resynthesizer that regenerates the potentially problematic carrier signals, and a signal combiner that subtracts the regenerated carrier signals from the original multi-carrier signal, thus creating a multi-carrier signal in which the potentially problematic carrier signals are attenuated and the weaker carrier signals are left unaffected.

DETAILED DESCRIPTION

Figure 1:
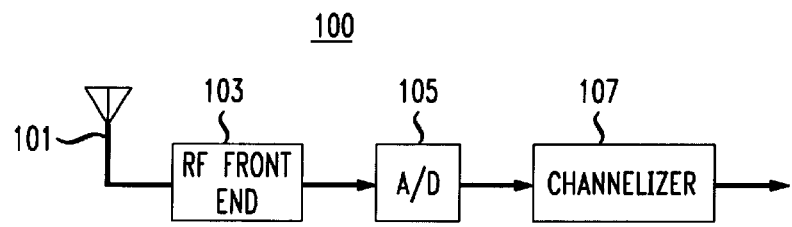
FIG. 1 depicts a block diagram of a block radio in the prior art.
Figure 2:
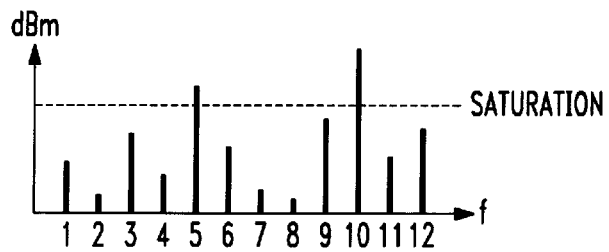
FIG. 2 depicts a graph of the signal strength for each of twelve frequency-disparate carrier signals in an illustrative multi-carrier signal.
Figure 3:
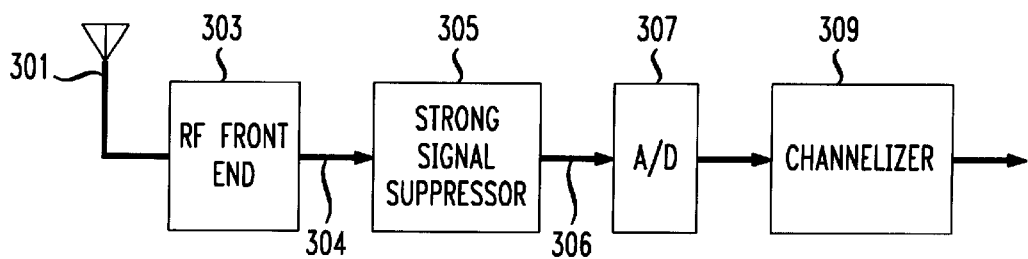
FIG. 3 depicts a block diagram of a block radio in accordance with the illustrative embodiment of the present invention.

FIG. 3 depicts a block diagram of digital radio receiver 300 in accordance with the illustrative embodiment of the present invention. Digital radio receiver 300 advantageously comprises: antenna 301, RF front end 303, strong signal suppressor 305, analog-to-digital converter 307 and channelizer 309, interconnected as shown. Antenna 301 receives a multi-carrier RF signal and converts it into an electrical signal for RF front end 303, in well-known fashion. RF front end 303 amplifies the multi-carrier signal, typically using a low-noise amplifier, and downconverts the multi-carrier signal to either baseband or a suitable intermediate frequency signal, also in well-known fashion. It will be clear to those skilled in the art how to make and use antenna 301 and RF front end 303.

The output of RF front end 303 is advantageously fed into strong signal suppressor 305, which identifies which, if any, carrier signals in the multi-carrier signal are so strong that they might saturate analog-to-digital converter 307. When strong signal suppressor 305 identifies any carrier signals whose signal strength is problematic, strong signal suppressor 305 selectively attenuates those carrier signals in the multi-carrier signal so as to prevent the possibility that analog-to-digital converter 307 can saturate. The details of strong signal suppressor 305 will be discussed below.

Analog-to-digital converter 307 takes the output of strong signal suppressor 305 on lead 306 and digitizes the multi-carrier signal, in well-known fashion. Analog-to-digital converter 307 is advantageously of sufficiently high-quality and sufficiently high-resolution to enable channelizer 309 to selectively separate out and demodulate each carrier signal of interest. In the illustrative embodiment, analog-to-digital converter 307 has a resolution of 16 bits. It will be clear to those skilled in the art how to make and use analog-to-digital converter 307.

Channelizer 307 receives the digitized output of analog-to-digital converter 307 and 25 demodulates each signal of interest in the digitized multi-carrier signal, in well-known fashion. It will be clear to those skilled in the art how to make and use channelizer 307.

Figure 4:
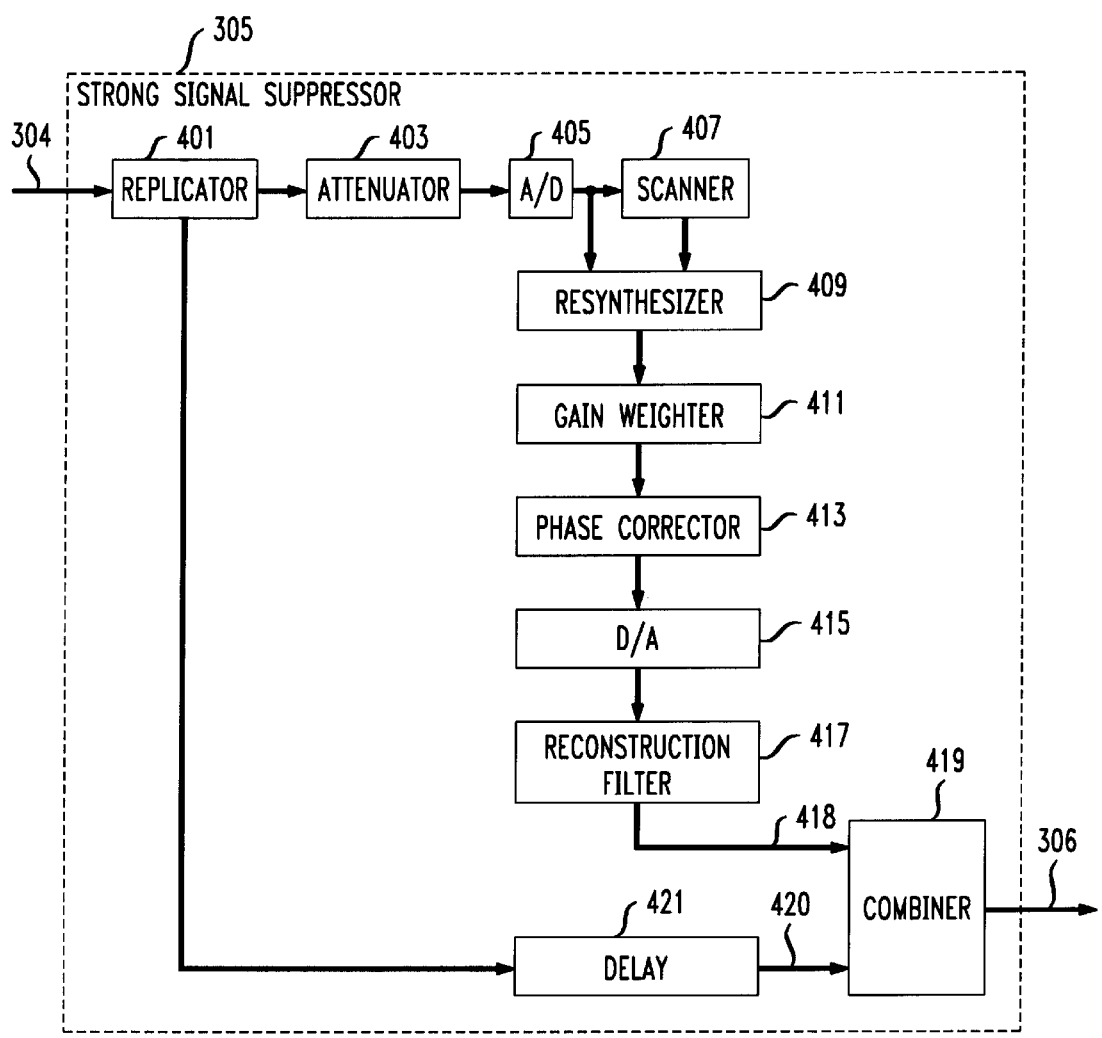
FIG. 4 depicts a block diagram of the strong signal suppressor depicted in FIG. 3.

FIG. 4 depicts a block diagram of strong signal suppressor 305, in accordance with the illustrative embodiment of the present invention.

Figure 5:
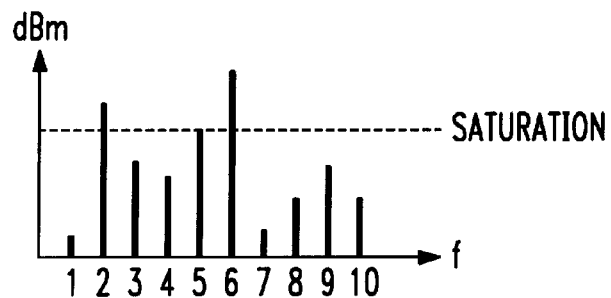
FIG. 5 depicts a graph of the signal strength for each of ten frequency-disparate carrier signals in an illustrative multi-carrier signal entering replicator 401 in FIG. 4.

For pedagogical purposes, the illustrative embodiment of the present invention will be presented as it operates on an illustrative multi-carrier signal comprising ten carrier signals. FIG. 5 depicts a graph of the signal strength for each of ten frequency-disparate carrier signals in an illustrative multi-carrier signal, which enters strong signal suppressor 305 on lead 304. As shown in FIG. 5, the illustrative multi-carrier signal comprises two carrier signals, carrier signal #2 and carrier signal #6, whose signal strength will saturate analog-to-digital converter 307.

Strong signal suppressor 305 advantageously comprises two distinct signal paths between replicator 401 and signal combiner 419. In accordance with the illustrative embodiment, the first signal path comprises: attenuator 403, analog-to-digital converter 405, scanner 407, resynthesizer 409, gain weighter 411, phase corrector 413, digital-to-analog converter 415 and reconstruction filter 417. The second signal path advantageously comprises delay 421.

The function of the elements in the first signal path is to: (1) identify those carrier signals in the multi-carrier signal that might saturate analog-to-digital converter 307, (2) regenerate them in isolation from the other carrier signals, and (3) modify their amplitude and phase so that they can be combined with the original multi-carrier signal in such a way that the corresponding carrier signals in the multi-carrier signal are attenuated without affecting the weaker carrier signals in the multi-carrier signal.

Replicator 401 is advantageously a coupler that splits the incoming signal into two signals such that each signal is substantially an analog representation of the incoming signal, in well-known fashion. It will be clear to those skilled in the art that replicator 401 can be implemented using, for example, a Wilkinson coupler, a 3 dB Hybrid coupler, or any one of many other devices. Alternatively, replicator 401 could be an active device rather than a passive device. It will be clear to those skilled in the art how to make and use replicator 401.

Figure 6:
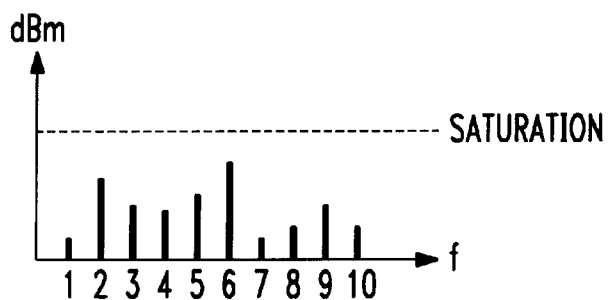
FIG. 6 depicts a graph of the signal strength for each of the ten frequency-disparate carrier signals in the illustrative multi-carrier signal upon exiting attenuator 403 in FIG. 4.

Attenuator 403 attenuates the multi-carrier signal entering analog-to-digital converter 405 so that it is improbable that any carrier signal in the attenuated multi-carrier signal will saturate analog-to-digital converter 405. Attenuator 403 can be a passive device, such as a resistor, or an active device that monitors the power in the multi-carrier signal, such as an automatic gain control circuit. It will be clear to those skilled in the art how to make and use attenuator 403. FIG. 6 depicts the illustrative multi-carrier signal as it is output from attenuator 403.

Analog-to-digital converter 405 digitizes the attenuated multi-carrier signal at a sufficient rate to satisfy the Nyquist criterion, in well-known fashion. Advantageously, analog-to-digital converter 405 can have lower resolution than analog-to-digital converter 307 and can be substantially less expensive than analog-to-digital converter 307. In the illustrative embodiment, analog-to-digital converter 405 has a resolution of 10 bits. The digitized multi-carrier carrier signal from analog-to-digital converter 405 is advantageously passed to both scanner 407 and resynthesizer 409. It will be clear to those skilled in the art how to make and use analog-to-digital converter 405.

Scanner 407 searches through the digitized multi-carrier signal to identify those carrier signals that might saturate analog-to-digital converter 307. In the illustrative example, scanner 407 identifies carrier signal #2 and carrier signal #6 as problematic and conveys that information to resynthesizer 409. It will be clear to those skilled in the art how to make and use scanner 407.

Figure 7:
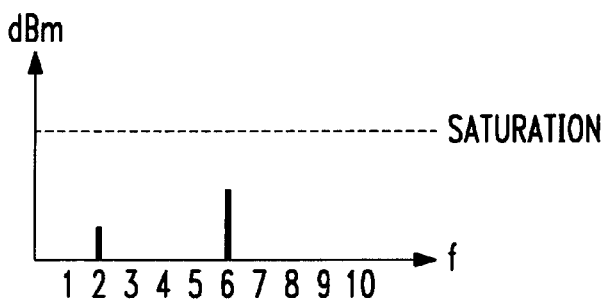
FIG. 7 depicts a graph of the signal strength for each of the ten frequency-disparate carrier signals in the illustrative multi-carrier signal upon entering combiner 419 on lead 418 in FIG. 4.

Resynthesizer 409 takes the output of analog-to-digital converter 405 and scanner 407 and regenerates a digital signal that comprises only those problematic carrier signals (e.g., carrier signal #2 and carrier signal #6). FIG. 7 depicts the regenerated signal as it is output from resynthesizer 409. It will be clear to those skilled in the art how to make and use resynthesizer 409.

Gain weighter 411 advantageously takes the output of resynthesizer 409 and adjusts the amplitude of the respective carrier signals, if necessary, to fine-tune the degree to which the carrier signals will ultimately be suppressed. It will be clear to those skilled in the art how to make and use gain weighter 411.

Phase corrector 413 takes the output of gain weighter 411 and compensates for any phase shift that has occurred in the first signal path in contrast with the second signal path. In the illustrative embodiment of the present invention, the phase shift through the first signal path is equal to the phase shift through the second signal path and combiner 419 vector subtracts the regenerated signal from the first signal path from the original multi-carrier signal from the second signal path. Alternatively, the phase shift through the first signal path for each carrier signal is 180° out-of-phase from the phase shift for each carrier signal through the second signal path and combiner 419 vector adds the signal from the first signal path to the signal from the second signal path. It will be clear to those skilled in the art how to make and use phase corrector 413.

Digital-to-analog converter 415 advantageously synthesizes the output of phase corrector 413, in well-known fashion to create an analog regenerated signal. In the illustrative embodiment, digital-to-analog converter 415 has a resolution of 10 bits. It will be clear to those skilled in the art how to make and use digital-to-analog converter 415.

Reconstruction filter 417 takes the output of digital-to-analog converter 415 and eliminates any alias signals that might be contained in the synthesized signal. FIG. 7 depicts the resynthesized signal as it enters combiner 419 on lead 418. It will be clear to those skilled in the art how to make and use reconstruction filter 417.

In the second signal path, delay 421 delays the undisturbed multi-carrier signal to compensate for the processing delay that occurs in the first signal path. Typically delay 421 comprises a fixed-length bulk delay and a smaller adjustable delay. It will be clear to those skilled in the art how to make and use delay 421.

Figure 8:
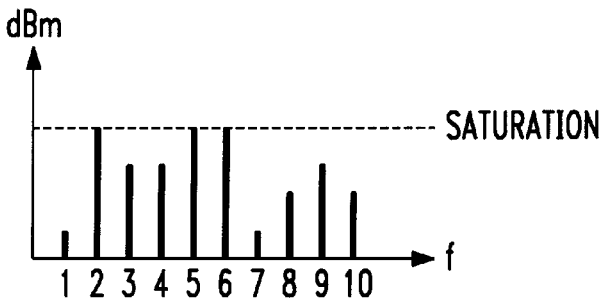
FIG. 8 depicts a graph of the signal strength for each of the ten frequency-disparate carrier signals in the illustrative multi-carrier signal upon exiting combiner 419 on lead 306 in FIG. 4.

Combiner 419 takes the signal on lead 420 from the second signal path (illustratively shown in FIG. 7) and vector subtracts it from the multi-carrier signal (illustratively shown in FIG. 5) to produce a multi-carrier signal (illustratively shown in FIG. 8) in which only the potentially problematic carrier signals, carrier signal #2 and carrier signal #6, have been attenuated. The output of combiner 419 then is fed into analog-to-digital converter 307 without the fear that analog-to-digital converter 307 will saturate. It will be clear to those skilled in the art bow to make and use combiner 419.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. An apparatus for processing an input signal, said apparatus comprising:

a signal replicator for creating a first signal based on said input signal and for putting said first signal on a first signal path, and for creating a second signal based on said input signal and for putting said second signal on a second signal path, wherein said first signal and said second signal are each analog representations of said input signal;

a signal combiner for receiving a plurality of analog regenerated signals from said first signal path and for receiving said second signal from said second signal path, and for creating an output signal based on the vector difference of said plurality of analog regenerated signals and said second signal;

a scanner for identifying a plurality of strong signals in said first signal; and a resynthesizer in said first signal path for regenerating said plurality of strong signals to create a plurality of digital regenerated signals; and an digital-to-analog converter in said first signal path for converting said plurality of digital regenerated signals to said plurality of analog regenerated signals.

2. The apparatus of claim I further comprising a phase correction circuit for making the phase shift through said second signal path the same as the phase shift through said first signal path.

3. The apparatus of claim I further comprising a delay in said second signal path for making the delay through said first signal path equal to the delay through said second signal path.

4. A method of processing an input signal, said method comprising:

creating a first signal and a second signal with a signal divider, wherein said first signal and said second signal are each analog representations of said input signal;

scanning said first signal to identify a plurality of strong signals in said first signal;

regenerating said plurality of strong signals to create a plurality of digital regenerated signals;

converting said plurality of digital regenerated signals to a plurality of analog regenerated signals; and vector subtracting said plurality of analog regenerated signals from said second signal.

5. The method of claim 4 further comprising the step of shifting the phase of said first signal so that the phase shift through said second signal path is the same as the phase shift through said first signal path.

6. The method of claim further comprising the step of delaying said second signal so that the delay through said first signal path is equal to the delay through said second signal path.

7. An apparatus for processing an input signal, said apparatus comprising:

means for creating a first signal and a second signal based on said input signal;

a scanner for identifying a plurality of strong signals in said first signal;

a resynthesizer for regenerating said plurality of strong signals to create a plurality of digital regenerated signals;

an digital-to-analog converter for convertin said plurality of digital regenerated signals to a plurality of analog regenerated signals;

means for creating an output signal based on the vector difference of said second signal minus said plurality of analog regenerated signals.

8. The apparatus of claim further comprising a phase corrector for making the phase of said regenerated signal the same as said second signal.

9. The apparatus of claim 7 further comprising an analog-to-digital converter for digitizing said first signal.

10. A method of processing an input signal, said method comprising:

creating a first signal and a second signal, which are each analog representations of said input signal;

scanning said first signal to identify a plurality of strong signals in said first signal;

regenerating said plurality of strong signals to create a plurality of digital regenerated signals;

converting said plurality of digital regenerated signals to a plurality of analog regenerated signals; and combining said second signal and said plurality of analog regenerated signals to create an output signal such that output signal is based on the vector difference of said second signal minus said plurality of analog regenerated signals.

11. An apparatus for processing an input signal, said apparatus comprising:

an analog-to-digital converter for digitizing said input signal to create a digitized input signal, a scanner for scanning said digitized input signal to identify a plurality of strong signals;

a resynthesizer for regenerating said plurality of strong signals to create a plurality of digital regenerated signals; and a digital-to-analog converter for converting said plurality of digital regenerated signal to create an analog synthesized signal.

12. The apparatus of claim 11 further comprising a reconstruction filter for anti-aliasing said analog synthesized signal to create an anti-aliased signal.

13. A method for processing an input signal, said method comprising:

digitizing an input signal to create a digitized input signal;

scanning said digitized input signal to identify a plurality of strong signals;

regenerating said plurality of strong signals to create a plurality of digital regenerated signals; and converting said plurality of digital regenerated signals to create a plurality of analog regenerated signals.

14. The method of claim 13 further comprising the step of anti-aliasing said plurality of digital regenerated signals to create an anti-aliased signal.

15. The method of claim 13 further comprising the step of vector subtracting said plurality of digital regenerated signals from said input signal.

* * * * *